(12) United States Patent
Sawada et al.

(10) Patent No.: US 8,905,208 B2
(45) Date of Patent: Dec. 9, 2014

(54) DRIVING FORCE TRANSMISSION APPARATUS

(71) Applicants: JTEKT Corporation, Osaka-shi (JP); Toyota Jidosha Kabushiki Kaisha, Toyota-shi (JP)

(72) Inventors: Naoki Sawada, Handa (JP); Mikiharu Oyabu, Chiryu (JP); Yasunari Saito, Chiryu (JP); Masakatsu Kani, Kariya (JP); Shun Ohno, Anjo (JP); Hirotake Ito, Aichi-gun (JP); Yoshihiro Ikushima, Okazaki (JP)

(73) Assignees: JTEKT Corporation, Osaka-shi (JP); Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/911,439

(22) Filed: Jun. 6, 2013

(65) Prior Publication Data

US 2013/0327610 A1    Dec. 12, 2013

(30) Foreign Application Priority Data

Jun. 7, 2012    (JP) ................................. 2012-129898

(51) Int. Cl.
| | |
|---|---|
| *F16D 27/115* | (2006.01) |
| *F16D 11/14* | (2006.01) |
| *F16D 27/108* | (2006.01) |
| *F16D 125/38* | (2012.01) |

(52) U.S. Cl.
CPC .............. *F16D 11/14* (2013.01); *F16D 27/108* (2013.01); *F16D 27/115* (2013.01); *F16D 2125/38* (2013.01)
USPC ......... 192/35; 192/109 R; 192/84.7; 192/70.2

(58) Field of Classification Search
USPC ........... 192/84.91, 84.6, 84.7, 35, 84.96, 70.2
See application file for complete search history.

(56) References Cited

U.S. PATENT DOCUMENTS

| | | | | |
|---|---|---|---|---|
| 6,058,591 | A | * | 5/2000 | Prater .............................. 29/558 |
| 6,098,770 | A | | 8/2000 | Isley, Jr. |

(Continued)

FOREIGN PATENT DOCUMENTS

| | | |
|---|---|---|
| EP | 1 333 188 A1 | 8/2003 |
| EP | 1 394 436 A2 | 3/2004 |
| JP | 2002-48157 | 2/2002 |

OTHER PUBLICATIONS

Extended Search Report issued Sep. 23, 2013 in European Application No. 13170567.5

*Primary Examiner* — Troy Chambers
*Assistant Examiner* — Lillian Nguyen
(74) *Attorney, Agent, or Firm* — Oblon, Spivak, McClelland, Maier & Neustadt, L.L.P.

(57) ABSTRACT

A driving force transmission apparatus includes: a housing having an inner peripheral spline portion; an inner shaft having an outer peripheral spline portion; a main clutch including first outer and inner clutch plates respectively engaged with the inner and outer peripheral spline portions; a cam mechanism generating pressing force for pressing the main clutch by relatively rotating a pair of cam members; and an electromagnetic clutch mechanism including an armature engaged with the inner peripheral spline portion and applying rotation force to the cam mechanism for relatively rotating the cam members through energization of an electromagnetic coil. An end face facing the armature is formed in the inner peripheral spline portion between a first region engaged with the first outer clutch plate and a second region engaged with the armature. Movement of the armature toward the first region is regulated by contact of the armature with the end face.

8 Claims, 8 Drawing Sheets

(56) References Cited

U.S. PATENT DOCUMENTS

| | | |
|---|---|---|
| 6,349,809 B1 | 2/2002 | Isley, Jr. |
| 8,240,446 B2* | 8/2012 | Szuba .................... 192/70.2 |
| 8,607,952 B2* | 12/2013 | Keating et al. ............ 192/70.2 |
| 2004/0134736 A1 | 7/2004 | Ando et al. |
| 2004/0216973 A1 | 11/2004 | Senga et al. |
| 2008/0073170 A1* | 3/2008 | Matsumoto ................ 192/84.7 |
| 2008/0251344 A1* | 10/2008 | Ochiai et al. .............. 192/84.96 |
| 2010/0219036 A1 | 9/2010 | Uchida et al. |

* cited by examiner

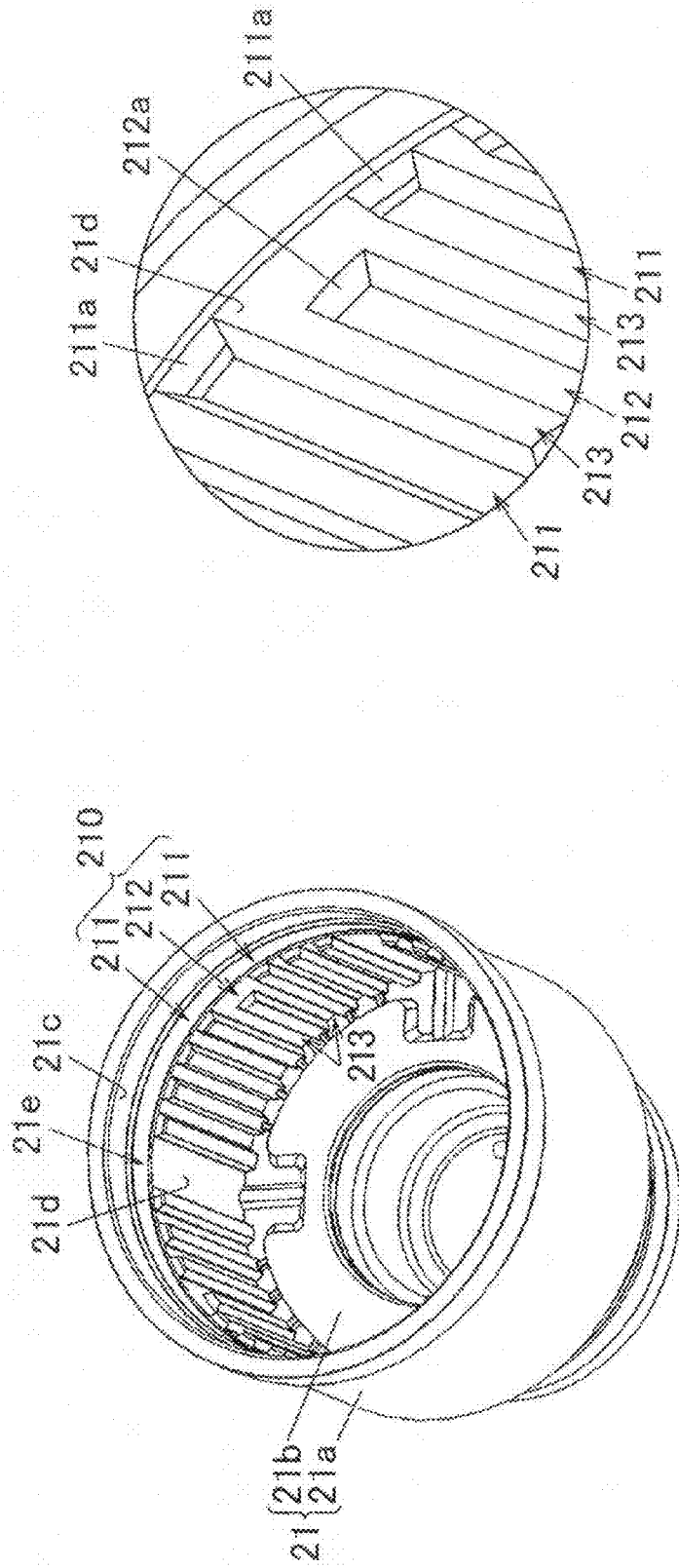

F I G . 6A
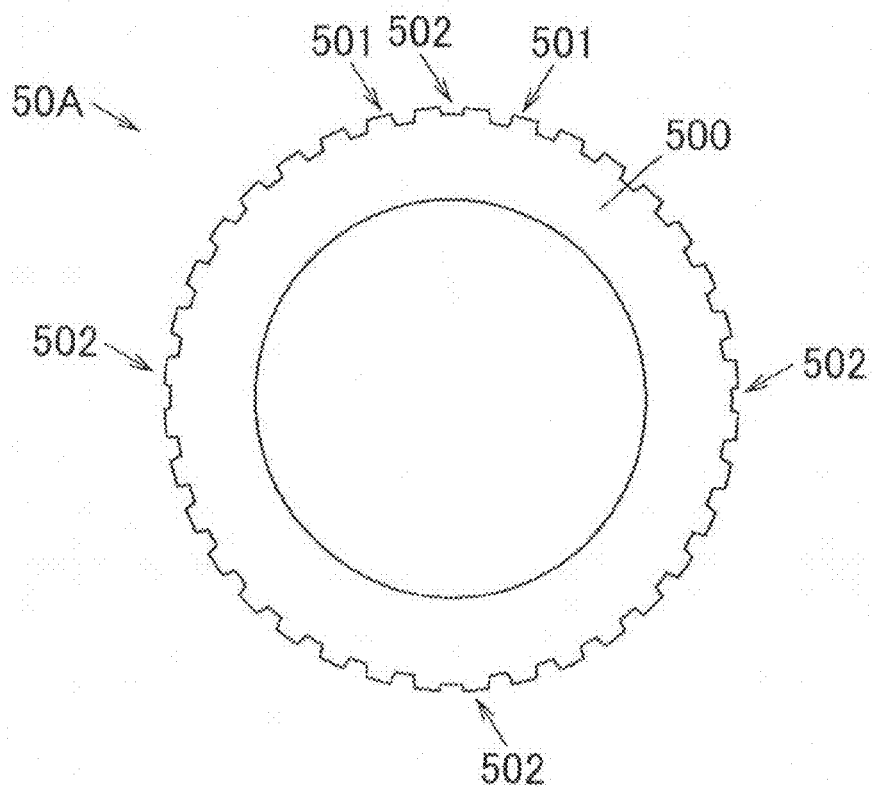
F I G . 6B
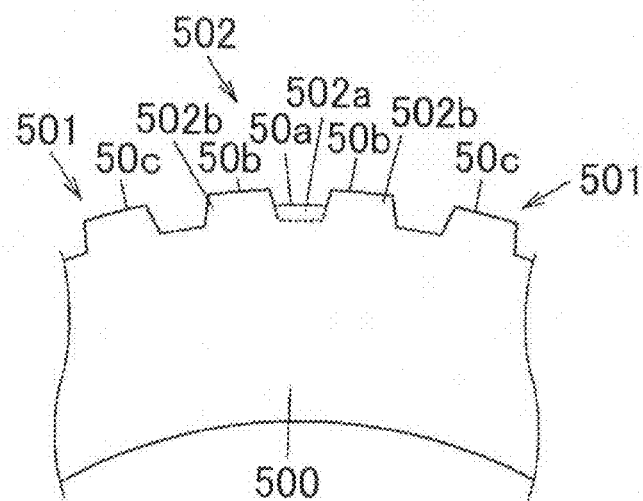

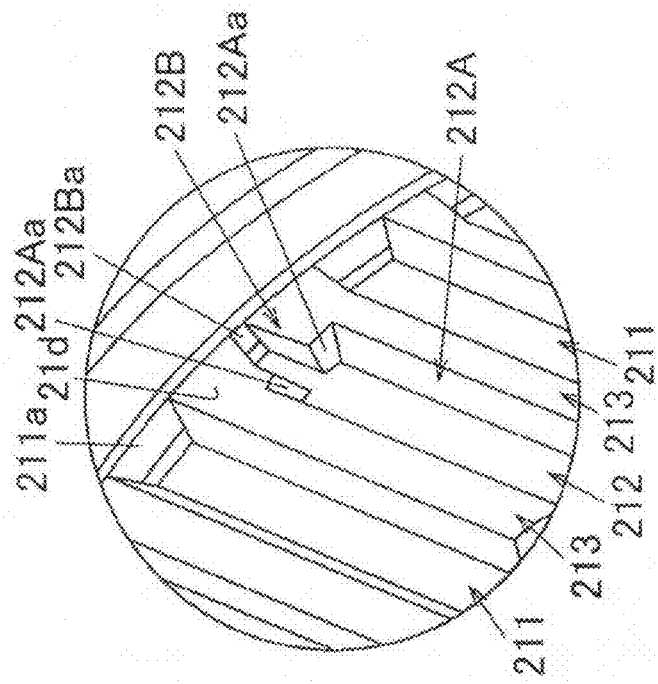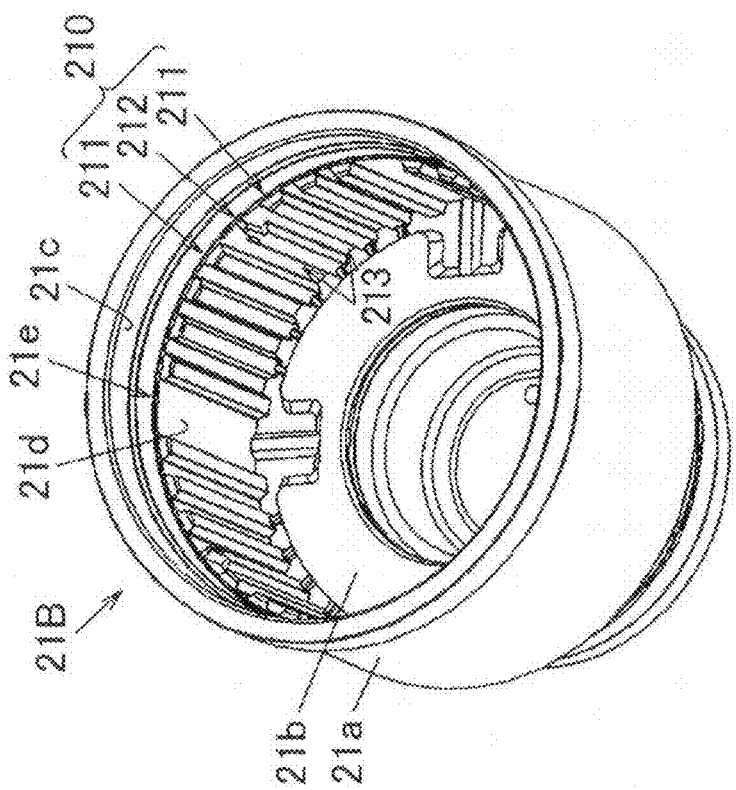

DRIVING FORCE TRANSMISSION APPARATUS

INCORPORATION BY REFERENCE

The disclosure of Japanese Patent Application No. 2012-129898 filed on Jun. 7, 2012 including the specification, drawings and abstract is incorporated herein by reference in its entirety.

BACKGROUND OF THE INVENTION

1. Field of the Invention

The invention relates to a driving force transmission apparatus that transmits driving force from an input shaft to an output shaft in, for example, an automobile.

2. Description of Related Art

There is an existing driving force transmission apparatus that is, for example, mounted on a four wheel drive and that couples a pair of rotating members by a clutch such that torque is transmittable (for example, see Japanese Patent Application Publication No. 2002-48157 (JP 2002-48157 A)).

The driving force transmission apparatus of this type includes an outer rotating member, an inner rotating member relatively rotatably supported coaxially with the outer rotating member, a main clutch that couples the outer rotating member to the inner rotating member such that torque is transmittable, an electromagnetic clutch mechanism arranged along a rotation axis in parallel with the main clutch, a cam mechanism that converts rotation force from the outer rotating member to pressing force toward the main clutch through actuation of the electromagnetic clutch.

The cam mechanism includes a pair of cam members, and is configured such that one of the cam members rotates relative to the other one of the cam members upon reception of rotation force from the electromagnetic clutch mechanism and then the other one of the cam members presses the main clutch as a result of the rotation.

The electromagnetic clutch mechanism includes an electromagnetic coil, an armature that receives electromagnetic force of the electromagnetic coil, and outer clutch plates and inner clutch plates that are pressed by the armature. The outer clutch plates are spline-engaged with the outer rotating member. The inner clutch plates are spline-engaged with the one of the cam members of the cam mechanism.

When the electromagnetic coil is energized, the armature presses the outer clutch plates and the inner clutch plates. Thus, the rotation force of the outer rotating member is transmitted to the one of the cam members, the rotation force is converted to axial pressing force, and the other one of the cam members presses the main clutch. Thus, the outer rotating member and the inner rotating member are coupled to each other such that torque is transmittable.

Incidentally, in order to ensure the strength, the cam members of the cam mechanism are formed of iron that is a magnetic material. Therefore, when the armature is close to the cam members at the time when the electromagnetic coil is energized, the cam members may form a magnetic path, and the armature may be attracted toward the cam members. In this case, the outer clutch plates and inner clutch plates of the electromagnetic clutch mechanism are not pressed, so the cam mechanism is not actuated, and the outer rotating member and the inner rotating member are not coupled to each other such that torque is transmittable.

In order to solve the above inconvenience, the driving force transmission apparatus described in JP 2002-48157 A includes a clearance regulating member formed of a non-magnetic material for ensuring a clearance between the armature and the cam members. The clearance regulating member specifically, for example, includes balls formed of a non-magnetic material and respectively fitted to fitting holes formed in the cam members or a leaf spring arranged between the cam members and the armature. Movement of the armature toward the cam members is regulated by the clearance regulating member, and the armature is reliably attracted toward the electromagnetic coil at the time when the electromagnetic coil is energized.

However, the driving force transmission apparatus described in JP 2002-48157 A additionally includes the clearance regulating member, so the number of components increases, and the number of assembling man-hours also increases. In this respect, there is still room for improvement.

SUMMARY OF THE INVENTION

The invention provides a driving force transmission apparatus that is able to regulate movement of an armature toward cam members without adding a member for ensuring a clearance between the armature and the cam members.

A first aspect of the invention relates to a driving force transmission apparatus. The driving force transmission apparatus includes: i) an outer rotating member having an inner peripheral spline portion at an inner periphery of the outer rotating member, the inner peripheral spline portion having a plurality of inner peripheral spline protrusions extending in a direction along a rotation axis; ii) an inner rotating member relatively rotatably supported coaxially with the outer rotating member, the inner rotating member having an outer peripheral spline portion at an outer periphery of the inner rotating member, and the outer peripheral spline portion having a plurality of outer peripheral spline protrusions extending in the direction along the rotation axis; iii) a main clutch including an outer clutch plate engaged with the inner peripheral spline portion so as to be axially movable and an inner clutch plate engaged with the outer peripheral spline portion so as to be axially movable, the main clutch being configured to couple the outer rotating member to the inner rotating member such that torque is transmittable; iv) a cam mechanism including a first cam member and a second cam member, the cam mechanism being configured to cause the second cam member to generate pressing force for pressing the main clutch by relatively rotating the first cam member with respect to the second cam member; and v) an electromagnetic clutch mechanism including an armature engaged with the inner peripheral spline portion so as to be axially movable and an electromagnetic coil configured to generate electromagnetic force for axially moving the armature, the electromagnetic clutch mechanism being configured to apply rotation force to the cam mechanism for relatively rotating the first cam member and the second cam member with respect to each other at the time when the electromagnetic coil is energized, wherein the inner peripheral spline portion has a first region with which the outer clutch plate is engaged and a second region with which the armature is engaged, the inner peripheral spline portion having a facing surface between the first region and the second region, the facing surface facing the armature, and movement of the armature toward the first region is regulated by contact of the armature with the facing surface.

In the driving force transmission apparatus according to the above aspect, a sectional area of each of the plurality of inner peripheral spline protrusions in a cross section perpendicular to the rotation axis may be smaller in the second region than in the first region, and a step face resulting from a difference in the sectional area may be the facing surface.

In the driving force transmission apparatus according to the above aspect, the facing surface may be provided at part of the plurality of inner peripheral spline protrusions of the inner peripheral spline portion.

In the driving force transmission apparatus according to the above aspect, the plurality of inner peripheral spline protrusions of the inner peripheral spline portion may include a first inner peripheral spline protrusion engaged with the outer clutch plate and the armature and a second inner peripheral spline protrusion engaged with the outer clutch plate and not engaged with the armature, and an end face of the second inner peripheral spline protrusion at a side close to the second region may be the facing surface.

In the driving force transmission apparatus according to the above aspect, a radial height of at least part of the plurality of inner peripheral spline protrusions of the inner peripheral spline portion may be lower in the second region than in the first region, and a step face resulting from a difference in the height may be the facing surface.

In the driving force transmission apparatus according to the above aspect, a circumferential width of at least part of the plurality of inner peripheral spline protrusions of the inner peripheral spline portion may be narrower in the second region than in the first region, and a step face resulting from a difference in the width may be the facing surface.

According to the aspect of the invention, it is possible to regulate movement of the armature toward the cam members without adding a member for ensuring a clearance between the armature and the cam members, and it is possible to suppress an increase in the number of components and an increase in the number of assembling man-hours.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3A is an overall perspective view of the inner surface of a front housing;

FIG. 3B is a partially enlarged view of FIG. 3A;

FIG. 6A is a plan view of an armature according to the second embodiment of the invention;

FIG. 6B is a partially enlarged view of FIG. 6A;

FIG. 7A is an overall perspective view of the inner surface of a front housing according to a third embodiment of the invention;

FIG. 7B is partially enlarged view of FIG. 7A;

DETAILED DESCRIPTION OF EMBODIMENTS

First Embodiment

Figure 1:
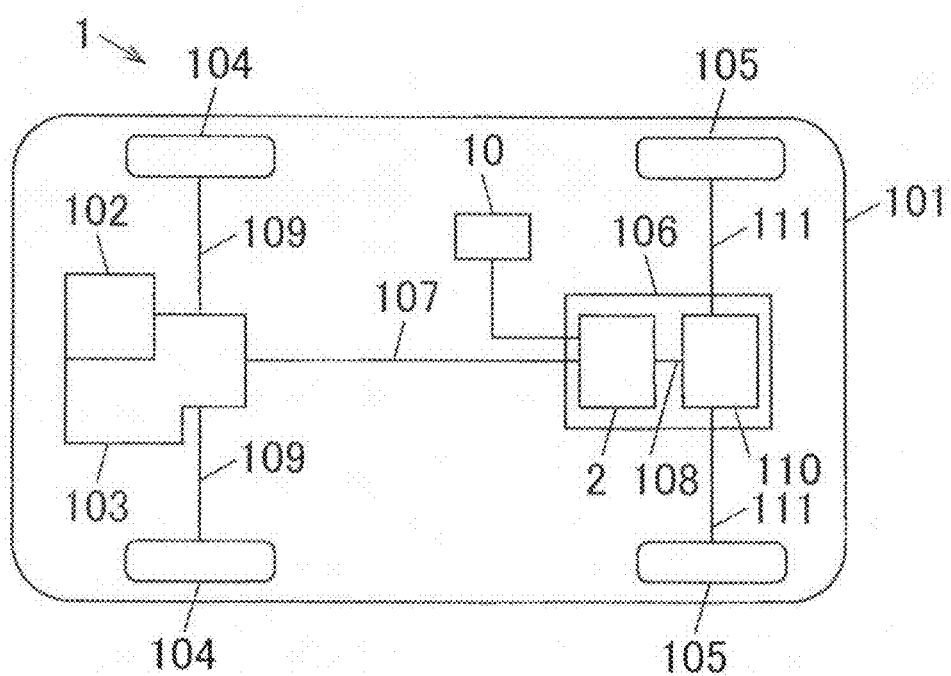
FIG. 1 is a schematic configuration view that shows an example of the configuration of a four wheel drive on which a driving force transmission apparatus according to a first embodiment of the invention is mounted.

FIG. 1 is a schematic configuration view that shows an example of the configuration of a four wheel drive on which a driving force transmission apparatus according to a first embodiment of the invention is mounted.

The four wheel drive 1 includes an engine 102, a transaxle 103, a pair of front wheels 104, a pair of rear wheels 105, a rear differential carrier 106, a propeller shaft 107 and a driving force transmission apparatus 2. The engine 102 serves as a driving source. The transaxle 103 includes a transmission and a front differential.

The driving force transmission apparatus 2 is arranged in a driving force transmission path from a front wheel side to a rear wheel side in the four wheel drive 1, and is supported on a vehicle body 101 via the rear differential carrier 106. The driving force transmission apparatus 2 couples the propeller shaft (input shaft) 107 to a drive pinion shaft (output shaft) 108 such that torque is transmittable, and is configured to be able to transmit the driving force of the engine 102 to the rear wheels 105 in this coupled state.

The driving force transmission apparatus 2 receives current that is supplied from a control device 10, and transmits driving force based on the supplied current from the propeller shaft 107 to the drive pinion shaft 108. The control device 10 executes control for increasing or decreasing current that is supplied to the driving force transmission apparatus 2 on the basis of, for example, a rotation speed difference between the front wheels 104 and the rear wheels 105, a driver's accelerator operation amount (accelerator pedal depression amount), or the like.

With the above configuration, the engine 102 drives the front wheels 104 by outputting the driving force to front axle shafts 109 via the transaxle 103. In addition, the engine 102 drives the rear wheels 105 by outputting the driving force to rear axle shafts 111 via the transaxle 103, the propeller shaft 107, the driving force transmission apparatus 2, the drive pinion shaft 108 and a rear differential 110.

Configuration of Driving Force Transmission Apparatus 2

Figure 2:
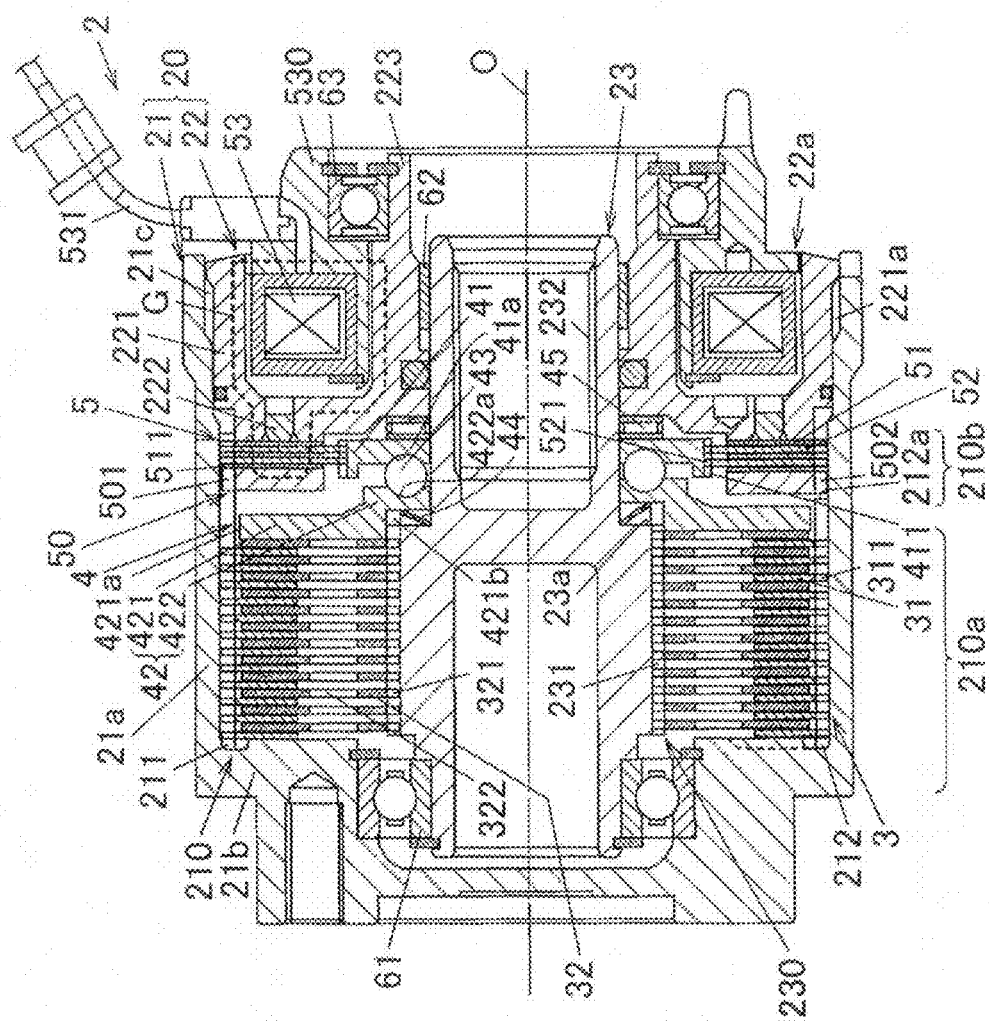
FIG. 2 is a sectional view that shows an example of the configuration of the driving force transmission apparatus.

FIG. 2 is a sectional view that shows an example of the configuration of the driving force transmission apparatus 2. In FIG. 2, the upper side with respect to a rotation axis O shows the operated state (torque transmission state) of the driving force transmission apparatus 2, the lower side with respect to the rotation axis O shows the non-operated state (torque non-transmission state) of the driving force transmission apparatus 2.

The driving force transmission apparatus 2 includes a housing 20, a cylindrical inner shaft 23, a main clutch 3, a cam mechanism 4 and an electromagnetic clutch mechanism 5. The housing 20 is formed of a front housing 21 and a rear housing 22, and serves as an outer rotating member. The inner shaft 23 is relatively rotatably supported coaxially with the housing 20, and serves as an inner rotating member. The main clutch 3 couples the housing 20 to the inner shaft 23 such that torque is transmittable. The cam mechanism 4 generates pressing force for pressing the main clutch 3. The electromagnetic clutch mechanism 5 is arranged across the cam mechanism 4 from the main clutch 3.

The housing 20 is formed by connecting the closed-end cylindrical front housing 21 to the annular rear housing 22 that partially covers the opening side of the front housing 21. Lubricating oil (not shown) is enclosed in the internal space of the housing 20.

The front housing 21 integrally has a cylindrical portion 21a and a bottom portion 21b, and has an internal thread portion 21c at the inner surface of the opening end portion of the cylindrical portion 21a. The front housing 21 is formed of a magnetic material, such as iron. The propeller shaft 107 (see FIG. 1) is coupled to the bottom portion 21b via, for example, a cross joint so as to be relatively non-rotatable. The front housing 21 may be formed of a non-magnetic material, such as aluminum.

An inner peripheral spline portion 210 is formed at the inner periphery of the cylindrical portion 21a. The inner peripheral spline portion 210 has a plurality of first inner peripheral spline protrusions 211 extending in a direction along a rotation axis and a plurality of second inner peripheral spline protrusions extending in the direction along the rotation axis similarly. The inner peripheral spline portion 210 has a first region 210a and a second region 210b. First outer clutch plates 31 (described later) are spline-engaged with the first region 210a. An armature 50 and second outer clutch plates 51 (described later) are spline-engaged with the second region 210b. The details of the inner peripheral spline portion 210 will be described later.

The rear housing 22 is formed of a first member 221, a second member 222 and a third member 223. The first member 221 is made of a magnetic material, such as iron. The second member 222 is made of a non-magnetic material, such as an austenitic stainless steel, integrally connected to the inner peripheral side of the first member 221 by welding, or the like. The third member 223 is made of a magnetic material, such as iron, integrally connected to the inner peripheral side of the second member 222 by welding, or the like. An annular accommodating space 22a is formed between the first member 221 and the third member 223. The accommodating space 22a accommodates an electromagnetic coil 53 (described later). An external thread portion 221a is formed at the outer periphery of the first member 221. The external thread portion 221a is screwed to the internal thread portion 21c of the front housing 21.

The inner shaft 23 is supported on the inner peripheral side of the housing 20 via a ball bearing 61 and a needle roller bearing 62. An outer peripheral spline portion 230 is formed at the outer periphery of the inner shaft 23. The outer peripheral spline portion 230 has a plurality of outer peripheral spline protrusions 231 extending in the direction along the rotation axis. In addition, a spline fitting portion 232 is formed at the inner surface of one end portion of the inner shaft 23. One end portion of the drive pinion shaft 108 (see FIG. 1) is fitted to the spline fitting portion 232 so as to be relatively non-rotatable.

The main clutch 3 is formed of a wet multi-disc clutch that includes the plurality of first outer clutch plates 31 and a plurality of first inner clutch plates 32. The first outer clutch plates 31 and the first inner clutch plates 32 are arranged alternately along the rotation axis O of the housing 20. A plurality of protrusions 311 are provided at the outer peripheral portions of the first outer clutch plates 31. The protrusions 311 are spline-engaged with the inner peripheral spline portion 210. In addition, a plurality of protrusions 321 are provided at the inner peripheral portions of the first inner clutch plates 32. The protrusions 321 are spline-engaged with the outer peripheral spline portion 230 of the inner shaft 23.

The first outer clutch plates 31 are relatively non-rotatable and axially movable with respect to the front housing 21. The first inner clutch plates 32 are relatively non-rotatable and axially movable with respect to the inner shaft 23. The first inner clutch plates 32 have a plurality of oil holes 322 for flowing lubricating oil. The first outer clutch plates 31 correspond to one aspect of an "outer clutch plate" according to the invention, and the first inner clutch plates 32 correspond to one aspect of an "inner clutch plate" according to the invention.

The cam mechanism 4 includes a pilot cam 41, a main cam 42 and a plurality of spherical cam balls 43. The pilot cam 41 serves as a first cam member. The main cam 42 serves as a second cam member and axially presses the main clutch 3. The cam balls 43 are arranged between the pilot cam 41 and the main cam 42.

The main cam 42 integrally has an annular plate-shaped pressing portion 421 and a cam portion 422. The pressing portion 421 contacts the first inner clutch plate 32 at one end of the main clutch 3, and presses the main clutch 3. The cam portion 422 is provided at the inner peripheral side of the main cam 42 with respect to the pressing portion 421. An outer periphery 421a of the pressing portion 421 faces the inner peripheral spline portion 210 (the first inner peripheral spline protrusions 211 and the second inner peripheral spline protrusions 212).

The main cam 42 has spline teeth 421b at the inner side of the pressing portion 421. The spline teeth 421b are spline-engaged with the outer peripheral spline portion 230 of the inner shaft 23. Thus, the main cam 42 is relatively non-rotatable and axially movable with respect to the inner shaft 23. A leaf spring 44 is arranged between the main cam 42 and a step face 23a formed in the inner shaft 23. The leaf spring 44 urges the main cam 42 toward the pilot cam 41.

A spline engaging portion 411 is formed at the outer peripheral portion of the pilot cam 41. A thrust needle roller bearing 45 is arranged between the pilot cam 41 and the third member 223 of the rear housing 22, and movement of the pilot cam 41 toward the rear housing 22 is regulated.

A plurality of cam grooves 41a, 422a are respectively formed at the facing surfaces of the pilot cam 41 and the cam portion 422 of the main cam 42. The axial depth of each of the plurality of cam grooves 41a, 422a varies in the circumferential direction. The spherical cam ball 43 is arranged between each cam groove 41a of the pilot cam 41 and the corresponding cam groove 422a of the main cam 42. The cam mechanism 4 causes the main cam 42 to generate axial pressing force for pressing the main clutch 3 by relatively rotating the pilot cam 41 with respect to the main cam 42.

The electromagnetic clutch mechanism 5 includes the armature 50, the plurality of second outer clutch plates 51, a plurality of second inner clutch plates 52 and the electromagnetic coil 53.

The armature 50 is an annular member made of a magnetic material, such as iron. A plurality of first and second protrusions 501, 502 are provided at the outer peripheral portion of the armature 50. The first and second protrusions 501, 502 are spline-engaged with the inner peripheral spline portion 210 of the front housing 21. The armature 50 is relatively non-rotatable and axially movable with respect to the front housing 21. The details of the armature 50 will be described later.

The second outer clutch plates 51 and the second inner clutch plates 52 are arranged alternately along the rotation axis O between the armature 50 and the rear housing 22. A plurality of protrusions 511 are provided at the outer peripheral portion of each of the second outer clutch plates 51. The protrusions 511 are spline-engaged with the inner peripheral spline portion 210 of the front housing 21. A plurality of protrusions 521 are provided at the inner peripheral portion of each of the second inner clutch plates 52. The protrusions 521 are spline-engaged with the spline engaging portion 411 of the pilot cam 41.

The second outer clutch plates 51 are relatively non-rotatable and axially movable with respect to the front housing 21. The second inner clutch plates 52 are relatively non-rotatable and axially movable with respect to the pilot cam 41.

The electromagnetic coil 53 is held by an annular yoke 530 made of a magnetic material, and is accommodated in the accommodating space 22a of the rear housing 22. The yoke 530 is supported by the third member 223 of the rear housing 22 via a ball bearing 63, and the outer periphery of the yoke 530 faces the inner periphery of the first member 221. The inner periphery of the yoke 530 faces the outer periphery of the third member 223. An exciting current is supplied from the control device 10 to the electromagnetic coil 53 via a wire 531.

In the thus configured driving force transmission apparatus 2, when an exciting current is supplied from the control device 10 to the electromagnetic coil 25, a magnetic flux is generated in a magnetic path G that passes through the yoke 530, the first member 221 and third member 223 of the rear housing 22, the second outer clutch plates 51, the second inner clutch plates 52 and the armature 50. The armature 50 is attracted toward the rear housing 22 by the electromagnetic force of the magnetic flux to move in the axial direction, and presses the second outer clutch plates 51 and the second inner clutch plates 52.

Thus, the second outer clutch plates 51 and the second inner clutch plates 52 frictionally slide on each other, the rotation force of the housing 20 is transmitted to the pilot cam 41 of the cam mechanism 4, and the pilot cam 41 relatively rotates with respect to the main cam 42. That is, when the electromagnetic coil 53 is energized, the electromagnetic clutch mechanism 5 applies rotation force to the cam mechanism 4 to relatively rotate the pilot cam 41 with respect to the main cam 42.

Through relative rotation between the pilot cam 41 and the main cam 42, the cam balls 43 roll between the corresponding cam grooves 41a, 422a, and axial thrust force is generated in a direction in which the pilot cam 41 separates from the main cam 42. The main cam 42 presses the main clutch 3 with this thrust force, and the housing 20 and the inner shaft 23 are coupled to each other such that torque is transmittable.

On the other hand, when an exciting current to the electromagnetic coil 25 is interrupted, the main cam 42 is pushed back toward the pilot cam 41 by the urging force of the leaf spring 44, and the cam balls 43 move to the deepest positions of the corresponding cam grooves 41a, 422a. Thus, a clearance is formed between any adjacent two of the first outer clutch plates 31 and the first inner clutch plates 32 of the main clutch 3, lubricating oil flows into the clearance, and the coupled state between the housing 20 and the inner shaft 23 is released. That is, the driving force transmission apparatus 2 enters the non-operated state.

Configuration of Front Housing 21

FIG. 3A is an overall perspective view of the inner surface of the front housing 21. FIG. 3B is a partially enlarged view of FIG. 3A.

The inner peripheral spline portion 210 according to the present embodiment is formed of the first inner peripheral spline protrusions 211 and the second inner peripheral spline protrusions 212. The first inner peripheral spline protrusions 211 are engaged with the first outer clutch plates 31 and the armature 50. The second inner peripheral spline protrusions 212 are engaged with the first outer clutch plates 31 but are not engaged with the armature 50. The first inner peripheral spline protrusions 211 and the second inner peripheral spline protrusions 212 are formed so as to radially protrude from an inner periphery 21d of the front housing 21 toward the rotation axis O (shown in FIG. 1). Spline clearances 213 are respectively formed between any adjacent pairs of the first inner peripheral spline protrusions 211 and between any adjacent pairs of the first inner peripheral spline protrusion 211 and the second inner peripheral spline protrusion 212.

The first inner peripheral spline protrusions 211 are formed so as to extend parallel to the rotation axis O in a range including the first region 210a and second region 210b of the inner peripheral spline portion 210. The second inner peripheral spline protrusions 212 are formed so as to extend parallel to the rotation axis O in a range including the first region 210a of the inner peripheral spline portion 210, and are not formed in the second region 210b. That is, each second inner peripheral spline protrusion 212 is formed so as to be shorter in the length in the direction along the rotation axis than each first inner peripheral spline protrusion 211, and is formed so as not to be engaged with the armature 50 due to a difference in the length.

In the present embodiment, the inner peripheral spline portion 210 is formed of the twenty-eight first inner peripheral spline protrusions 211 and the four second inner peripheral spline protrusions 212. The four second inner peripheral spline protrusions 212 are formed at four locations at equal intervals in the circumferential direction with respect to the rotation axis O. The circumferential interval between any adjacent pair of the first inner peripheral spline protrusion 211 and the second inner peripheral spline protrusion 212 is equal to the circumferential interval between any adjacent pair of the first inner peripheral spline protrusions 211.

In addition, no-tooth portions 21e, in which no first inner peripheral spline protrusion 211 is formed, are formed at the inner periphery 21d of the front housing 21 at four locations in the circumferential direction. The no-tooth portions 21e smooth flow of lubricating oil in the front housing 21.

An end face 212a of each second inner peripheral spline protrusion 212 at a side close to the opening of the front housing 21 (side close to the second region 210b) is formed between the first region 210a and the second region 210b. More specifically, the end face 212a is closer to the opening of the front housing 21 (the rear housing 22) than an end portion of the outer periphery 421a of the pressing portion 421 of the main cam 42 at a side close to the second region 210b in the non-operated state of the driving force transmission apparatus 2.

Thus, the sectional area of the inner peripheral spline portion 210 in a cross section perpendicular to the rotation axis O is the total of the sectional areas of the plurality (twenty-eight) of first inner peripheral spline protrusions 211 and the sectional areas of the plurality (four) of the second inner peripheral spline protrusions 212 in the first region 210a, and is the total of the sectional areas of the plurality (twenty-eight) of the first inner peripheral spline protrusions 211 in the second region 210b. That is, the sectional area of the inner peripheral spline portion 210 in the cross section perpendicular to the rotation axis O is smaller in the second region 210b than in the first region 210a with the end face 212a set as a boundary. That is, the end face 212a corresponds to one aspect of a step face that is formed by a difference in the sectional area of the inner peripheral spline portion 210.

The end face 211a of each first inner peripheral spline protrusion 211 at the side close to the opening of the front housing 21 is located closer to the opening of the front housing 21 than the opening-side end face 212a of each second inner peripheral spline protrusion 212.

The end face 212a of each second inner peripheral spline protrusion 212 is formed as a facing surface that axially faces the armature 50. Movement of the armature 50 toward the first region 210a is regulated by contact of the armature 50 with the end faces 212a.

Configuration of Armature 50

Figure 4A:
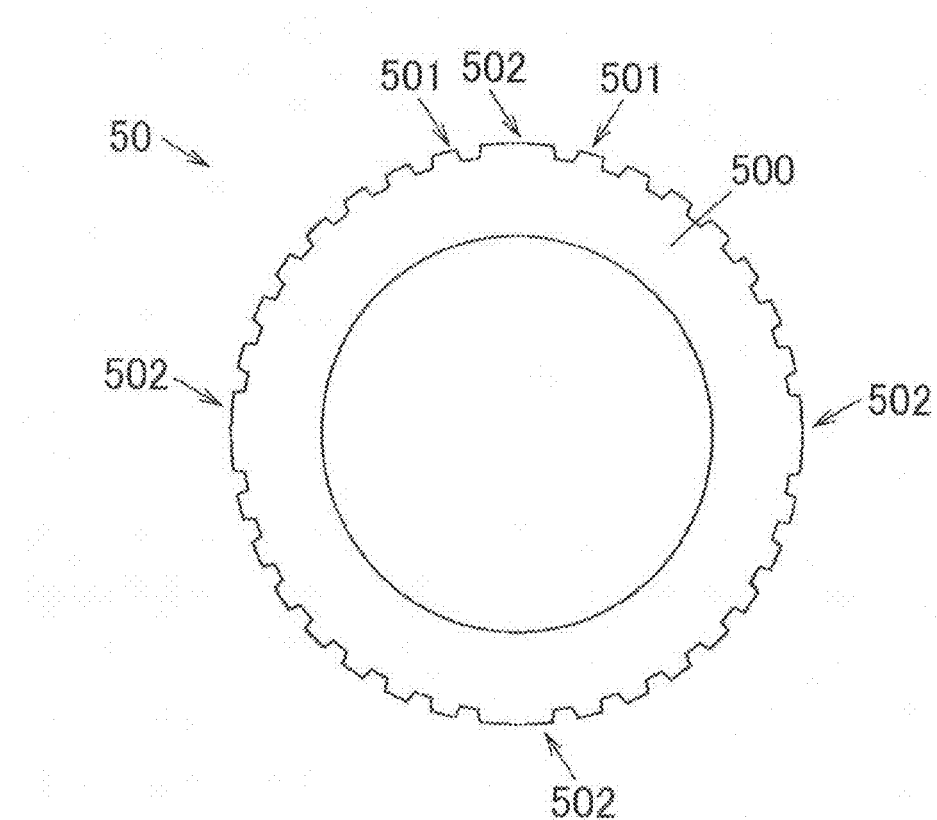
FIG. 4A is a plan view of an armature.
Figure 4B:
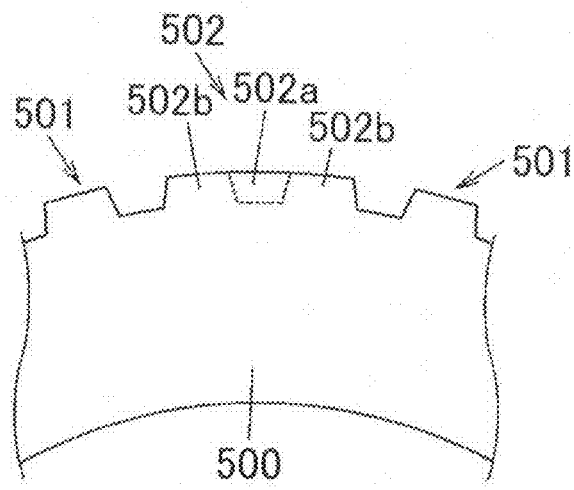
FIG. 4B is a partially enlarged view of FIG. 4A.

FIG. 4A shows a plan view of the armature 50. FIG. 4B is a partially enlarged view of FIG. 4A.

In the armature 50, a plurality of first protrusions 501 and a plurality of second protrusions 502 are provided at the outer peripheral side of an annular base portion 500. The first protrusions 501 are engaged between any adjacent pairs of the first inner peripheral spline protrusions 211 and between any adjacent pairs of the first inner peripheral spline protrusion 211 and the second inner peripheral spline protrusion 212. The second protrusions 502 are engaged between any adjacent pairs of first inner peripheral spline protrusions 211 across the second inner peripheral spline protrusion 212.

Each second protrusion 502 is formed so as to be longer in the width in the circumferential direction than each first protrusion 501. More specifically, each second protrusion 502 has a width obtained by connecting the pair of circumferentially adjacent first protrusions 501. The second protrusions 502 are formed at four locations of the armature 50 so as to respectively face the end faces 212a of the four second inner peripheral spline protrusions 212.

In FIG. 4B, a region 502a that axially faces the end face 212a of the second protrusion 502 is indicated by the dashed line. Regions 502b that do not face the end face 212a are formed on the both sides of the region 502a in the circumferential direction. Each of the regions 502b faces the bottom portion 21b of the front housing 21 via the spline clearance 213 between the first inner peripheral spline protrusion 211 and the second inner peripheral spline protrusion 212.

During non-energization of the electromagnetic coil 53, when the armature 50 moves toward the first region 210a (toward the bottom portion 21b) due to, for example, vibrations, acceleration, deceleration, or the like, of the four wheel drive 1, the region 502a of each second protrusion 502 contacts the corresponding end face 212a, and further movement of the armature 50 toward the first region 210a is regulated. Thus, the driving force transmission apparatus 2 is configured such that the armature 50 does not contact the main cam 42.

It is possible to manufacture the front housing 21 by, for example, casting. In this case, it is possible to form the inner peripheral spline portion 210 by providing recesses, corresponding to the first inner peripheral spline protrusions 211 and the second inner peripheral spline protrusions 212, in a mold. In addition, to improve the positional accuracy and profile irregularity of the end face 212a in each second inner peripheral spline protrusion 212, it is advised that the length of each second inner peripheral spline protrusion 212 in its extending direction is formed slightly long at the time of casting, and, after that, the end portion of each second inner peripheral spline protrusion 212 is cut by machining to form the end face 212a.

Operation and Advantageous Effects of First Embodiment

According to the above-described present embodiment, the second protrusions 502 of the armature 50 contact the corresponding end faces 212a of the second inner peripheral spline protrusions 212, and movement of the armature 50 toward the first region 210a is regulated, so the armature 50 does not contact the main cam 42, and an axial clearance is ensured between the armature 50 and the pressing portion 421 of the main cam 42. Thus, when the electromagnetic coil 53 is energized, the armature 50 is prevented from being attracted toward the main cam 42. In addition, it is not required to provide a member for regulating movement of the armature 50 toward the first region 210a, so it is possible to suppress an increase in the number of components and an increase in the number of assembling man-hours.

Second Embodiment

Next, a second embodiment of the invention will be described with reference to FIG. 5A to FIG. 6B. A driving force transmission apparatus according to the present embodiment differs from the first embodiment in the shape of a front housing and the shape of an armature, and the other configuration is similar to that of the first embodiment. Hereinafter, like reference numerals denote components having substantially the same functions as those described in the first embodiment, and the overlap description is omitted.

Figure 5A:
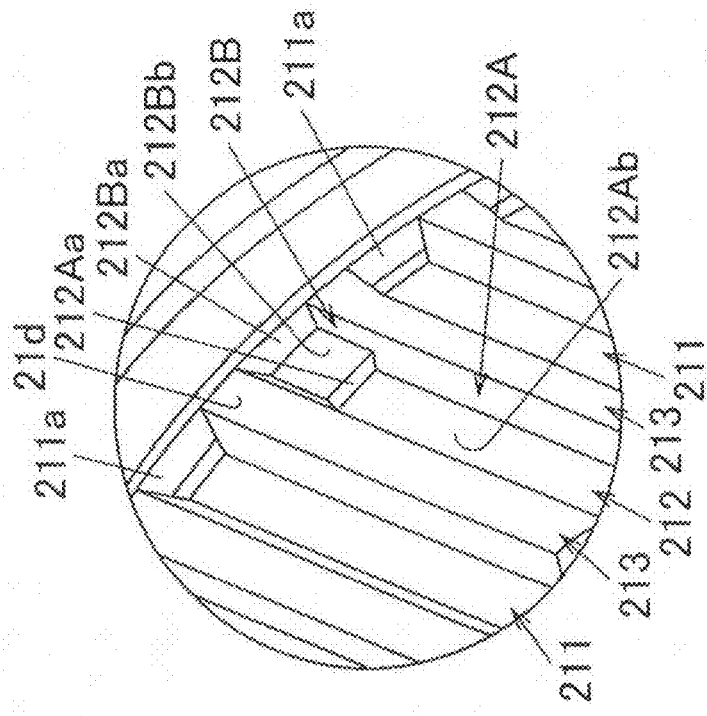
FIG. 5A is an overall perspective view of the inner surface of a front housing according to a second embodiment of the invention.
Figure 5B:
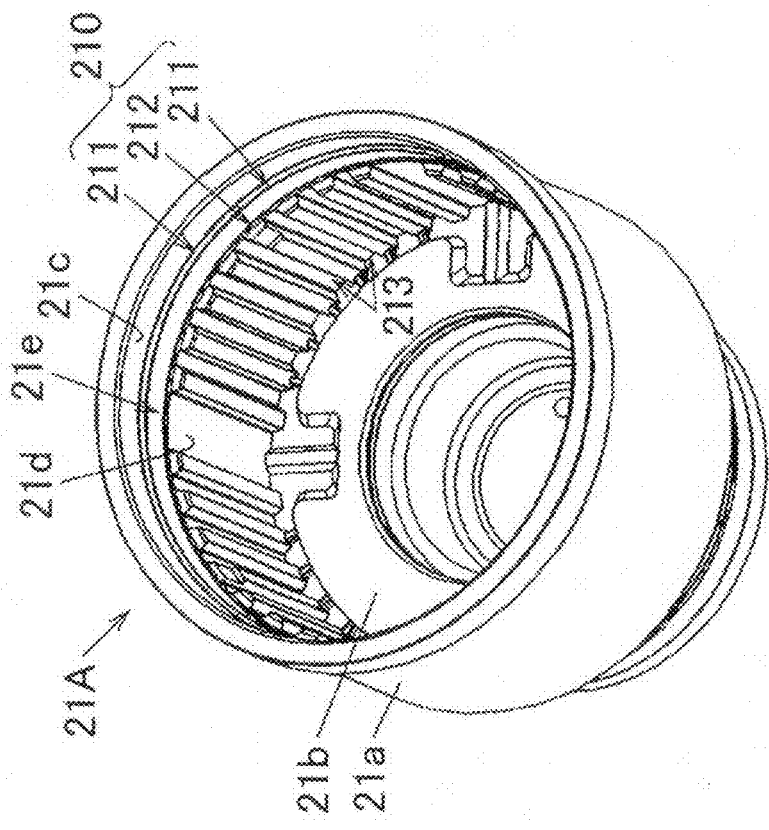
FIG. 5B is a partially enlarged view of FIG. 5A.

FIG. 5A shows an overall perspective view of the inner surface of a front housing 21A according to the present embodiment. FIG. 5B is a partially enlarged view of FIG. 5A. FIG. 6A shows a plan view of an armature 50A according to the present embodiment. FIG. 6B is a partially enlarged view of FIG. 6A.

The front housing 21A according to the present embodiment differs from that of the first embodiment in the shape of each second inner peripheral spline protrusion 212, and the other configuration is similar to that of the first embodiment. In the present embodiment, each second inner peripheral spline protrusion 212 is formed over the first region 210a and second region 210b of the inner peripheral spline portion 210, and the radial height of each second inner peripheral spline protrusion 212 is lower in the second region 210b than in the first region 210a. A step face 212Aa as a result of a difference in the height is formed between the first region 210a and the second region 210b.

More specifically, each second inner peripheral spline protrusion 212 is formed of a first spline portion 212A on a side closer to the first region 210a than the step face 212Aa and a second spline portion 212B on a side closer to the second region 210b than the step face 212Aa, and the inner surface (rotation axis O-side surface) of the second spline portion 212B is located more radially outward than an inner surface 212Ab of the first spline portion 212A. Thus, the height of each second spline portion 212B from the inner periphery 21d of the front housing 21 at the spline clearance 213 is lower than the height of each first spline portion 212A from the inner periphery 21d.

That is, the inner peripheral spline portion 210 is formed such that the sectional area in the cross section perpendicular to the rotation axis O is smaller in the second region 210b than in the first region 210a, and each step face 212Aa is formed by a difference in the sectional area.

The axial location of each step face 212Aa in the front housing 21A is the same as the axial location of each end face 212a in the front housing 21 in the first embodiment. That is, each step face 212Aa is closer to the opening of the front housing 21A than the end portion of the outer periphery 421a of the pressing portion 421 of the main cam 42 at the side close to the second region 210b in the non-operated state.

An end face 212Ba of each second spline portion 212B at the side close to the opening of the front housing 21 is formed at the same location in the direction along the rotation axis O as the opening-side end face 211a of each first inner peripheral spline protrusion 211. That is, in the present embodiment, each first inner peripheral spline protrusion 211 and each second inner peripheral spline protrusion 212 are formed to have the same length.

As shown in FIG. 6A and FIG. 6B, the armature 50A according to the present embodiment differs from the armature 50 according to the first embodiment in the shape of each second protrusion 502, and the other configuration is similar to that of the first embodiment.

Each second protrusion 502 according to the present embodiment is formed so as to be engaged with the second spline portion 212B of each second inner peripheral spline protrusion 212. More specifically, in each second protrusion 502, an outer periphery 50a facing the inner surface 212Bb of each second spline portion 212B is located more radially inward than outer peripheries 50b on both sides in the circumferential direction. The distance of each outer periphery 50b from the rotation axis O is equal to the distance of an outer periphery 50c of each first protrusion 501 from the rotation axis O.

Each region 502a on the inner side of the outer periphery 50a faces the step face 212Aa that is the end face of each first spline portion 212A at the side close to the opening of the front housing 21. That is, each step face 212Aa is formed as a facing surface that faces the armature 50A (region 502a). The regions 502b that do not face the step face 212Aa are formed on the inner sides of the outer peripheries 50b on both sides of the region 502a in the circumferential direction.

Operation and Advantageous Effects of Second Embodiment

According to the above-described present embodiment, operation and advantageous effects similar to those described in the first embodiment are obtained. In addition, each second protrusion 502 is engaged with the second spline portion 212B of the corresponding second inner peripheral spline protrusion 212, so the location and orientation of the armature 50A in the front housing 21 become more stable.

Third Embodiment

Next, a third embodiment of the invention will be described with reference to FIG. 7A to FIG. 8B. A driving force transmission apparatus according to the present embodiment differs from the first embodiment in the shape of a front housing and the shape of an armature, and the other configuration is similar to that of the first embodiment. Hereinafter, like reference numerals denote components having substantially the same functions as those described in the first embodiment, and the overlap description is omitted.

Figure 8A:
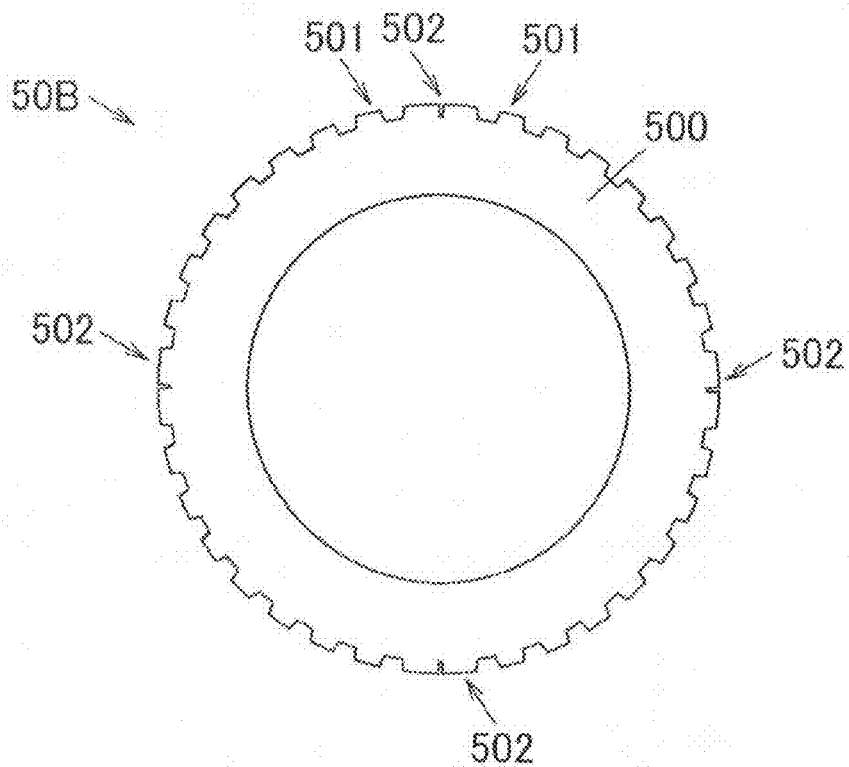
FIG. 8A is a plan view of an armature according to the third embodiment of the invention.
Figure 8B:
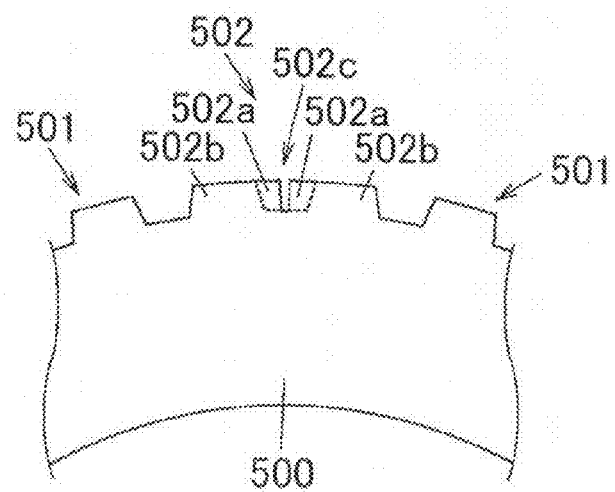
FIG. 8B is a partially enlarged view of FIG. 8A.

FIG. 7A shows an overall perspective view of the inner surface of a front housing 21B according to the present embodiment. FIG. 7B is a partially enlarged view of FIG. 7A. FIG. 8A shows a plan view of an armature 50B according to the present embodiment. FIG. 8B is a partially enlarged view of FIG. 8A.

In the front housing 21B according to the present embodiment, each second inner peripheral spline protrusion 212 is formed over the first region 210a and second region 210b of the inner peripheral spline portion 210, and the circumferential width of each second inner peripheral spline protrusion 212 is narrower in the second region 210b than in the first region 210a. The step faces 212Aa as a result of a difference in the width are formed between the first region 210a and the second region 210b.

More specifically, each second inner peripheral spline protrusion 212 is formed of the first spline portion 212A at the side closer to the first region 210a than the step faces 212Aa and the second spline portion 212B at the side closer to the second region 210b than the step faces 212Aa, and the second spline portion 212B is narrower in the width in the circumferential direction of the front housing 21B than the first spline portion 212A. In the example shown in FIG. 7A and FIG. 7B, the two step faces 212Aa are formed on both sides of each second spline portion 212B in the circumferential direction.

That is, the inner peripheral spline portion 210 is formed such that the sectional area in the cross section perpendicular to the rotation axis O is smaller in the second region 210b than in the first region 210a, and the two step faces 212Aa are formed by a difference in the sectional area.

The axial locations of the step face 212Aa in the front housing 21B are the same as the axial location of each end face 212a in the front housing 21 in the first embodiment. That is, the step faces 212Aa are closer to the opening of the front housing 21B than the end portion of the outer periphery 421a of the pressing portion 421 of the main cam 42 at the side close to the second region 210b in the non-operated state.

As shown in FIG. 8A and FIG. 8B, the armature 50B according to the present embodiment differs from the armature 50 according to the first embodiment in the shape of each second protrusion 502, and the other configuration is similar to that of the first embodiment.

Each second protrusion 502 according to the present embodiment is formed so as to be engaged with each second spline portion 212B of the second inner peripheral spline protrusion 212. More specifically, each second protrusion 502 has a groove 502c at its center portion in the circumferential direction, and each second spline portion 212B is engaged with the groove 502c. Each groove 502c is formed to be radially recessed from the outer periphery of the armature 50B, and extends through the armature 50B in the thickness direction.

The regions 502a that axially face the step faces 212Aa are formed on both sides of each groove 502c in the circumferential direction. That is, the step faces 212Aa are formed as facing surfaces that face the armature 50B (regions 502a). The regions 502b that do not face the step faces 212Aa are formed on the inner side of the outer peripheries 50b on both sides of the regions 502a in the circumferential direction.

Operation and Advantageous Effects of Third Embodiment

According to the above-described present embodiment, operation and advantageous effects similar to those described in the first embodiment are obtained. In addition, each second protrusion 502 is engaged with the second spline portion 212B of the corresponding second inner peripheral spline protrusion 212 at the groove 502c, so the location and orientation of the armature 50B in the front housing 21 become more stable.

Other Embodiment

The first to third embodiments of the invention are described above; however, the invention is not limited to these embodiments. The invention may be implemented as needed without departing from the scope of the invention. For example, in the above-described embodiments, the second inner peripheral spline protrusions 212 are formed at four locations of the inner surface of each of the front housing 21, 21A, 21B; however, it is not limited to this configuration. The second inner peripheral spline protrusions 212 just need to be formed at least two locations. In addition, in the second and third embodiments, the inner peripheral spline portion 210 may not have the first inner peripheral spline protrusions 211 but may have only the second inner peripheral spline protrusions 212.

What is claimed is:

1. A driving force transmission apparatus comprising:
an outer rotating member having an inner peripheral spline portion at an inner periphery of the outer rotating member, the inner peripheral spline portion having a plurality of inner peripheral spline protrusions extending in a direction along a rotation axis;
an inner rotating member relatively rotatably supported coaxially with the outer rotating member, the inner rotating member having an outer peripheral spline portion at an outer periphery of the inner rotating member, and the outer peripheral spline portion having a plurality of outer peripheral spline protrusions extending in the direction along the rotation axis;
a main clutch including an outer clutch plate engaged with the inner peripheral spline portion so as to be axially movable and an inner clutch plate engaged with the outer peripheral spline portion so as to be axially movable, the main clutch being configured to couple the outer rotating member to the inner rotating member such that torque is transmittable;
a cam mechanism including a first cam member and a second cam member, the cam mechanism being configured to cause the second cam member to generate pressing force for pressing the main clutch by relatively rotating the first cam member with respect to the second cam member; and
an electromagnetic clutch mechanism including an armature engaged with the inner peripheral spline portion so as to be axially movable and an electromagnetic coil configured to generate electromagnetic force for axially moving the armature, the electromagnetic clutch mechanism being configured to apply rotation force to the cam mechanism for relatively rotating the first cam member and the second cam member with respect to each other at the time when the electromagnetic coil is energized, wherein
the inner peripheral spline portion has a first region with which the outer clutch plate is engaged and a second region with which the armature is engaged, the inner peripheral spline portion having a facing surface between the first region and the second region, the facing surface facing the armature, and
movement of the armature toward the first region is regulated by contact of the armature with the facing surface.

2. A driving force transmission apparatus comprising:
an outer rotating member having an inner peripheral spline portion at an inner periphery of the outer rotating member, the inner peripheral spline portion having a plurality of inner peripheral spline protrusions extending in a direction along a rotation axis;
an inner rotating member relatively rotatably supported coaxially with the outer rotating member, the inner rotating member having an outer peripheral spline portion at an outer periphery of the inner rotating member, and the outer peripheral spline portion having a plurality of outer peripheral spline protrusions extending in the direction along the rotation axis;
a main clutch including an outer clutch plate engaged with the inner peripheral spline portion so as to be axially movable and an inner clutch plate engaged with the outer peripheral spline portion so as to be axially movable, the main clutch being configured to couple the outer rotating member to the inner rotating member such that torque is transmittable;
a cam mechanism including a first cam member and a second cam member, the cam mechanism being configured to cause the second cam member to generate pressing force for pressing the main clutch by relatively rotating the first cam member with respect to the second cam member; and
an electromagnetic clutch mechanism including an armature engaged with the inner peripheral spline portion so as to be axially movable and an electromagnetic coil configured to generate electromagnetic force for axially moving the armature, the electromagnetic clutch mechanism being configured to apply rotation force to the cam mechanism for relatively rotating the first cam member and the second cam member with respect to each other at the time when the electromagnetic coil is energized, wherein
the inner peripheral spline portion has a first region with which the outer clutch plate is engaged and a second region with which the armature is engaged, the inner peripheral spline portion having a facing surface between the first region and the second region, the facing surface facing the armature, and
movement of the armature toward the first region is regulated by contact of the armature with the facing surface, wherein
a sectional area of each of the plurality of inner peripheral spline protrusions in a cross section perpendicular to the rotation axis is smaller in the second region than in the first region, and
a step face resulting from a difference in the sectional area is the facing surface.

3. The driving force transmission apparatus according to claim 2, wherein
the facing surface is provided at part of the plurality of inner peripheral spline protrusions of the inner peripheral spline portion.

4. The driving force transmission apparatus according to claim 3, wherein
the plurality of inner peripheral spline protrusions of the inner peripheral spline portion include a first inner peripheral spline protrusion engaged with the outer clutch plate and the armature and a second inner peripheral spline protrusion engaged with the outer clutch plate and not engaged with the armature, and
an end face of the second inner peripheral spline protrusion at a side close to the second region is the facing surface.

5. The driving force transmission apparatus according to claim 2, wherein
a radial height of at least part of the plurality of inner peripheral spline protrusions of the inner peripheral spline portion is lower in the second region than in the first region, and
a step face resulting from a difference in the height is the facing surface.

6. The driving force transmission apparatus according to claim 2, wherein
a circumferential width of at least part of the plurality of inner peripheral spline protrusions of the inner peripheral spline portion is narrower in the second region than in the first region, and
a step face resulting from a difference in the width is the facing surface.

7. The driving force transmission apparatus according to claim 1, wherein the armature has an outer peripheral spline portion engaged with the inner peripheral spline portion in the second region.

8. The driving force transmission apparatus according to claim 1, wherein the inner peripheral spline portion comprises at least one first inner peripheral spline protrusion and at least one second inner peripheral spline protrusion, wherein the second inner peripheral spline protrusion is shorter than the first inner peripheral spline protrusion and does not extend to the second region with which the armature is engaged, and wherein the facing surface comprises an axial end surface of the second inner peripheral spline protrusion.

* * * * *